United States Patent [19]

Anderson et al.

[11] Patent Number: 4,990,856

[45] Date of Patent: Feb. 5, 1991

[54] MASS ANALYSIS APPARATUS AND METHOD

[75] Inventors: Weston A. Anderson, Palo Alto; James T. Arnold, Sunnyvale, both of Calif.

[73] Assignee: Varian Associates, Inc., Palo Alto, Calif.

[21] Appl. No.: 418,789

[22] Filed: Oct. 3, 1989

Related U.S. Application Data

[63] Continuation of Ser. No. 300,142, Jan. 23, 1989, abandoned, which is a continuation of Ser. No. 832,284, Feb. 21, 1986, abandoned.

[51] Int. Cl.$^5$ .............................................. G01N 27/62

[52] U.S. Cl. .................................... 324/464; 250/282; 250/291

[58] Field of Search ................ 324/464; 250/292, 280, 250/281, 290, 291

[56] References Cited

U.S. PATENT DOCUMENTS

| | | | |
|---|---|---|---|
| 3,555,273 | 1/1971 | Arnold | 250/41.9 |
| 3,937,955 | 2/1976 | Comisarow et al. | 250/291 X |
| 4,686,365 | 8/1987 | Meek et al. | 250/291 X |
| 4,755,670 | 7/1988 | Syka et al. | 250/292 |

OTHER PUBLICATIONS

International Journal of Mass Spectrometry and Ion Processes, 60 (1984) 85–98, "Recent Improvements in and Analytical Applications of Advanced Ion Trap Technology", G. C. Stafford, Jr., P. E. Kelley, J. E. P. Syka, W. E. Reynolds and J. F. J. Todd.

Physics Today/Aug. 1974, pp. 30–35, "Storing Ions for Collision Studies", F. L. Walls.

Institute of Applied Physics of Bonn University "Detecting Low Partial Pressures with the Ion Cage" G. Rettinghaus.

Advances in Electronics and Electron Physics Supplement, pp. 173–256, "Radiofrequency Quarupole Spectrometers" P. H. Dawson.

Precision Measurement and Fundamental Constants II, pp. 215–218 "Preliminary Comparison of the Positron and Electron Spin Anomalies" P. B. Schwinberg et al.

Precision Measurement and Fundamental Constants II, pp. 219–221 "Geonium Without a Magnetic Bottle–A New Generation" Gabrielse et al.

From the Physical Institute of Bonn University "The Three-Dimensional Stabilization of Charge Carriers in a Quadrupole Field" E. Fischer.

(List continued on next page.)

*Primary Examiner*—Reinhard J. Eisenzopf

*Assistant Examiner*—Jack B. Harvey

*Attorney, Agent, or Firm*—Stanley Z. Cole; David Schnapf

[57] ABSTRACT

A small sample of material is introduced into a vacuum to be analyzed, by ionization of atoms or molecular fragments of the sample using an electron or photon beam. The ionized species are trapped in a structure that defines electric fields or a combination of electric and magnetic fields in such a way that their motions are confined to the interior of the trap and that their motions within the trap are characterized by unique and discrete frequencies of oscillation dependent on the mass-to-charge ratio of the individual species. In order to provide for the detection of the frequencies of the motions, additional electrical signals are applied to the trapping structure so as to cause the motions to take place with a considerable degree of coherence. Alternatively, the coherence may be caused by creation of the ions during a very short pulse of the electron or photon beam at a position within the trapping structure but displaced from a positon of equilibrium. An electrical response to the individual motions of the ions, taking place at discrete frequencies related to their mass-to-charge ratios, frequency analyzed to determine the mass-to-charge ratios of the ions contribute to that electrical response, thereby indicating the types of ions present and their respective quantities.

31 Claims, 4 Drawing Sheets

OTHER PUBLICATIONS

International Journal of Mass Spectrometry and Ion Physics 14 (1974, 339–347) "Pulse-Out Synchronization in the Quadrupole Ion Trap" Dawson et al.

"Advanced Ion Trap Technology in an Econmical Detector for GC" Stafford et al.

Sov. Phys. Tech. Phys. vol. 18 No. 2 Aug. 1973 "Three-Dimensional Accumulation Quadrupole Mass Spectrometer" Sheretov et al.

General Electric Research and Development Center Schenectady, New York pp. 109–112 "The Three-Dimensional Quadrupole Ion Trap" Dawson et al.

Physical Review Letters Dec. 14, 1981 No. 24 "New Comparison of the Positron and Electron G Factors" Schwinberg et al.

Physical Review vol. 170 No. 1 Jun. 5, 1968 "Exchange-Collision Technique for the rf Spectroscopy of Stored Ions" Major et al.

Aus dem Physikalischen Institut der Justus-Lievig-Universitat Gieben, Mit 10 Figuren im Text May 19, 1959 "Ein Mebverfahren zur Untersuchung von Fluoreszenzabklingvorgangen" Schutz.

Journal of Applied Physics vol. 30 No. 3 Mar. 59 "Electrodynamic Containment of Charged Particles" Wuerker et al.

16
CONVERT
ADC
MEMORY
ADDRESS COUNTER
CLOCK
FOURIER ANALYZER
DISPLAY & STORAGE
CONTROL LINES
PULSE GENERATOR
CONTROLLER
VAPOR SOURCE
VACUUM ENCLOSURE
LASER
LASER POWER SUPPLY
E-GUN PULSER
Z
$W_0$
$V_0$
U

FREE OSCILLATION SIGNAL

FOURIER TRANSFORM OF FREE OSCILLATION SIGNAL SHOWING PEAKS FOR 3 ION SPECIES

MASS ANALYSIS APPARATUS AND METHOD

This application is a continuation, of application Ser. No. 07/300,142, filed Jan. 23, 1989, now abandoned, which is a continuation of application Ser. No. 832,284, filed Feb. 21, 1986, abandoned.

Field of the Invention

The present invention relates generally to a method of and apparatus for analyzing a gas sample and more particularly to a method and apparatus wherein ions created from the sample are trapped in an electromagnetic potential and are coherently excited to oscillate at frequencies characteristic of their mass and with amplitudes related in a knowable way with their quantity.

Background of the Invention

A method of and apparatus for analyzing a gas sample in a vacuum wherein sample species are ionized is disclosed. The ions present are trapped in a region by their interaction with electric and magnetic fields supported on structures disposed about the region. Without further provision, the ions, in general, will oscillate incoherently in the trapping region at frequencies that are specifically related to the masses of the ions. If the motion of individual ions of a species can be made to be coherent, the collective motion will induce perceptible electrical signals in elements of the external structures thereby providing means to detect the quantity and the mass of the ion species.

The size of the signal elicited from a species of ion is related to the number of ions present, the amplitude of their oscillations and the degree of coherence introduced into their motion. The relationship of the amplitude of the signals detected to the initial number of ions is not obvious for several reasons. First, there is a distribution of amplitudes of the motions of individual ions prior to any external excitations. Second, the signal amplitude depends on the degree to which coherence can be established in the motion of the ion population, and this quality is uncertain due to the initial motions of the ions prior to excitation. Third, if excitation be carried out too strongly, ions will be lost from the trap, thereby, in extreme, destroying the signal altogether.

Objects of the Invention

It is, therefore, an object of the present invention to provide a new and improved method of and apparatus for analyzing the quantity of ions of each of a number of species by a knowable relationship between the number of ions and the amplitude and coherence of their collective motion, and the identity of the ions by their mass and the known relationship between their mass and frequency of oscillation.

Summary of the Invention

This result is obtained by tailoring an excitation sequence applied to the ions that is able to create the desired coherent collective motion in selected ion species. The excitation sequence may comprise time dependent electric fields impressed on the trap region, by way of electrodes, of the trapping structure wherein the frequency spectrum of the impressed fields contains components able to excite all of the selected species. In one preferred embodiment, excitation is achieved by creating a time dependent field of the desired characteristics by coupling an alternating voltage source or through one or several pulses to selected electrodes of the structure, modulated both as to frequency and as to amplitude in order to achieve the desired result. After the excitation sequence that brings about the desired coherent collective motions of each selected ion species, the ions continue for a time to oscillate maintaining that coherence. The charge of the moving ions induces moving image charges in the electrode structure of the trap. The moving image charges comprise signal currents in electrical circuits external to the trap structure that can be amplified and detected in a normal way. The information in the signals observed is in the time domain; the information required is in the domain of frequency and amplitude. The latter can be derived from the former. One preferred method for this derivation is to perform the Fourier transformation of the time domain primary signal. This can be accomplished by first digitizing the time domain data at a rate which is greater by at least a factor of two than the highest frequency present in the primary signal, and storing these digital data; then, second, by performing a digital Fourier transformation of the stored time domain data to create a data set containing the required frequency and amplitude information. There exist well known computer methods to perform this function. The above and further objects, features and advantages of the present invention will become apparent upon consideration of the following detailed description of specific embodiments, taken in conjunction with the accompanying drawings.

Figure 1:
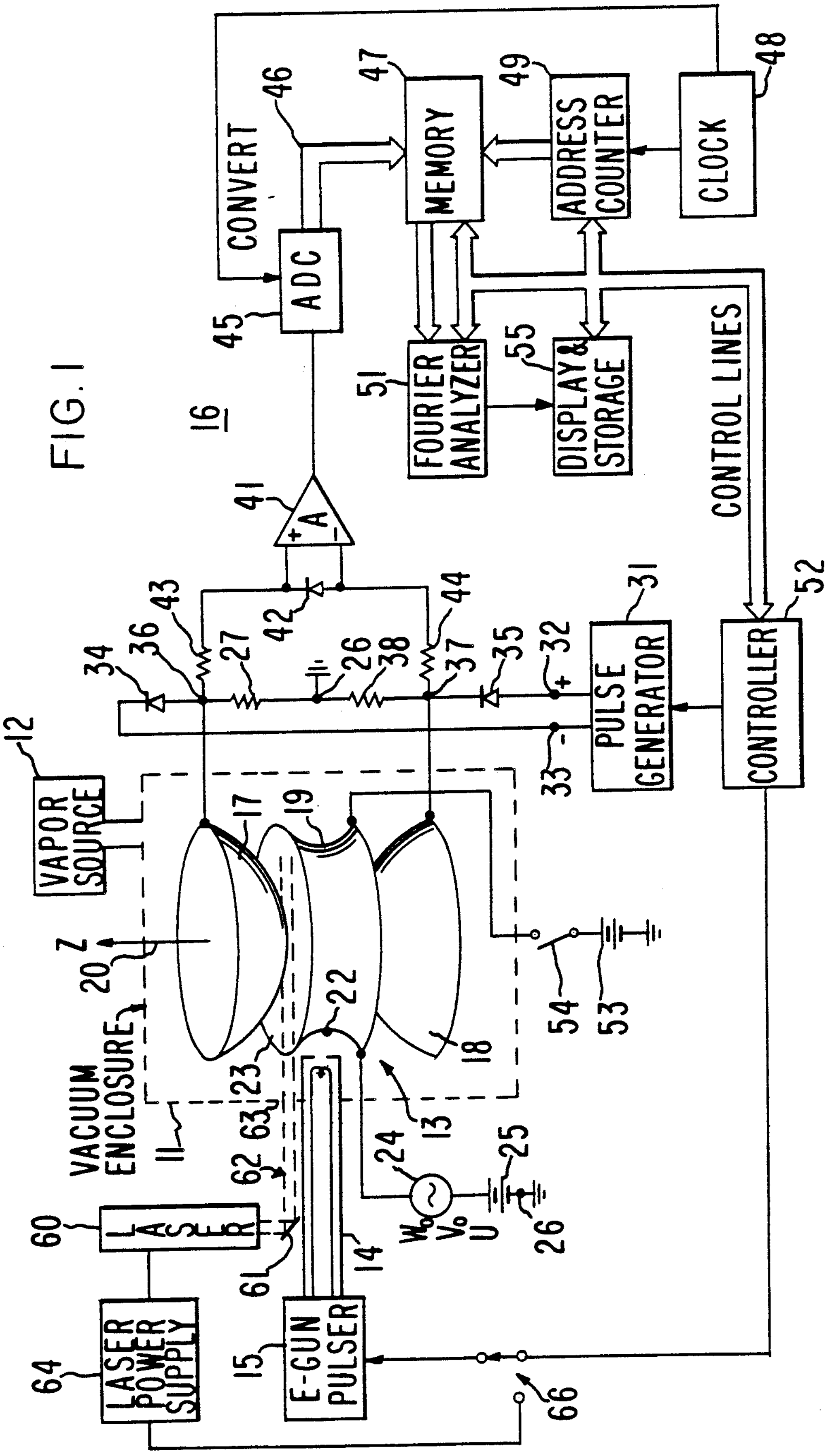
FIG. 1 is a partially schematic and partially perspective drawing of a first embodiment of the invention using a trapping means that relies on time varying electric fields alone with no magnetic fields present.

FIGS. *2a-2d* shows a set of electrical wave forms which are helpful in describing the operation of the embodiment of FIG. 1.

Figure 3:
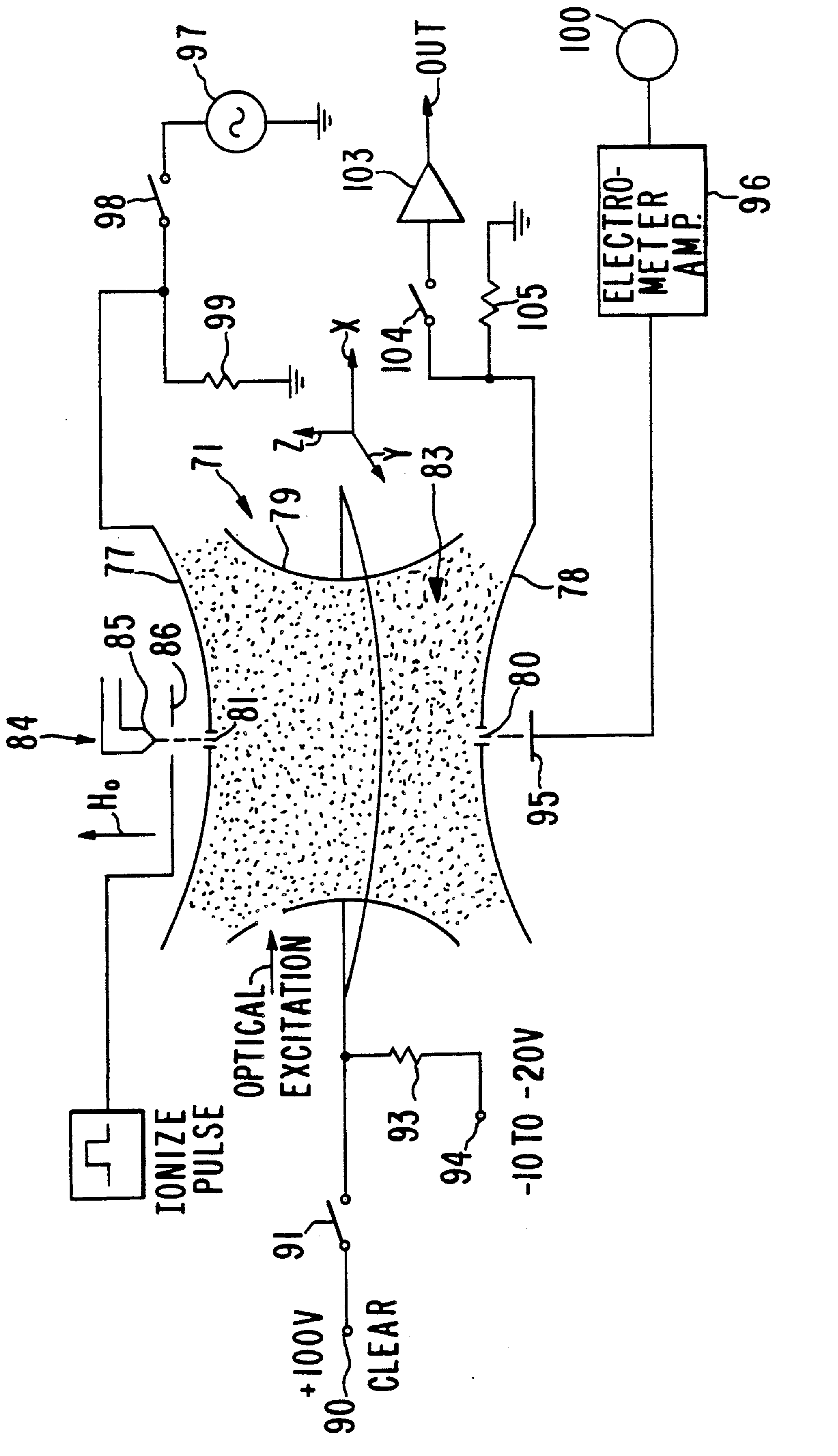

FIG. 3 is a schematic diagram of a second embodiment of the invention using a trapping means that employs static electric and magnetic fields.

FIG. *4a* is a schematic representation of a signal from ions acquired from apparatus of the type illustrated in FIGS. 1 and 3.

FIG. *4b* shows the signal of FIG. *4a* analyzed with a digital Fourier transformation system.

Detailed Description of Invention

Referring to FIG. 1 of the drawings, there is shown a vacuum enclosure 11 evacuated by a vacuum pumping system, (not shown), and also communicating with a sample source 12 from which a sample comprising one or several chemical species is drawn into the vacuum enclosure to be analyzed. Sample materials enter the vacuum enclosure 11 in vapor state and move promptly throughout the region, including the space central to the trapping electrode structure 13. Some molecules of the sample may be ionized periodically by pulses of electrons from electron gun 14 or by an optical beam 62 that is able to dislodge electrons or molecular ion fragments by single or multiphoton interactions. The ions may be trapped collectively or selectively in the region surrounded by the trapping electrode structure 13.

The nature of the trapping structure is devised in such a way that the ions experience forces that inhibit their escape from the structure, and that constrain the ions to motions within the trapping region, by impressing appropriate time dependent electrical potentials on the electrode structures. Provision for this application is found in FIG. 1 in the radiofrequency generator 24. Static potential may be added to the radio frequency potential via the battery 25.

It is well known that there can be no distribution of static electric potentials on the boundary of a region of space that will provide the forces necessary to trap an electrically charged particle in all directions within that region. However, when time dependent potentials, or the superposition of static and time dependent potentials are caused to be present in appropriate proportion on the boundaries of a region, and when there exist gradients of the electric fields as a result of the shaping of the electrodes bounding the region, trapping in all directions can be achieved. Moreover, when the geometry of the trap boundaries is appropriate, and the potentials distributed thereon are properly configured, the trapping forces can be made to confine charged particles such that they will carry out motions that have predominently pure harmonic character; that is, that the dominant motion occurs at discrete frequencies dependent on the mass of the ions and independent of the amplitude of the motion.

One simple way to achieve this desired condition is to configure the trap with boundaries that comprise electrical conductors which define equipotential surfaces, and to shape the bounding conductors so that they conform in three dimensional spaced to surfaces described by a quadratic expression in the variables which is a solution of the Laplace equation. Under these conditions, analogous quadratic expressions will also describe the potentials within the boundary of the conductors. Moreover, in the same space, there is an orthogonal set of coordinates in which coordinate system the quadratic expression comprises terms each containing just one of the three variables of that coordinate system. In that coordinate system, the components of the electric fields along the respective coordinate axes, at any point in the space it describes, will have intensities that are exactly proportional to displacement along those individual coordinate directions.

One such solution, W, of the Laplace equation in three coordinates x,y,z is the expression:

$$W=A\,x^2+B\,y^2+C\,z^2 \qquad (1)$$

where A, B, and C are constants and $-(A+B)=C>0$. For the present consideration, W may be interpreted to be an electrical potential.

The equipotential surfaces W of expression (1) are elliptical hyperboloids of one or two sheets depending on the sign of W. For a value of $W=W_o>0$, the equipotential of (1) is the elliptical hyperboloid of two sheets visualized near the center $x=y=z=0$, as two cap shaped surfaces that are convex toward the plane at $z=0$, symmetrically placed above and below that plane. Conversely, for a value of $W=-W_o<0$, the equipotential is the elliptical hyperboloid of one sheet visualized near the center $x=y=z=0$ as a belt-shaped surface symmetrically located between the two cap shaped sheets mentioned above. If three electrodes are shaped and disposed to conform to the surfaces at $W=W_o$ and $W=-W_o$, and are supplied at potentials corresponding to $+/-W_o$, then the potentials in the region between the conducting electrodes will conform to (1).

It is possible to define an associated function T such that $$T=A\,x^2+B\,y^2+C\,z^2-W_0 \qquad (2)$$

where T is also a solution to the Laplace equation and therefore can represent potential. This potential can be realized if the electrodes mentioned in the paragraph above are supplied with electrical connection so that the cap shaped electrodes 17, 18 have a potential zero and the belt shaped electrode 19 has a potential $-2\,W_o$. In this condition, the forces that influence charged particles within the region surrounded by the electrodes are defined by the electric field within the structure. The electric field at any point within the structure is described by the negative gradient of the electric potential. But the gradient of T is identical to the gradient of W; therefore the addition of an offset potential $-W_o$ in the expression (2) does not change the condition or possible motion of charged particles in the region.

Ions with positive charge present in the region bounded by the electrodes described in the preceding paragraphs are subject to a restoring force in the z direction that is proportional to the displacement from the plane $z=0$ and is directed toward that plane. If the electrodes are furnished with static electrical potentials only, the desired trapping in all 3 directions is not achieved. The forces in directions perpendicular to z are directed away from the line $x=y=0$, and trapping is in the z direction only; in fact the ions will be forced out of the region in a radial direction. This undesired result can be prevented if the static potential $-2\,W_o$ applied to the belt shaped electrode be replaced by time dependent potential V respectively where $V=V_o\cos(wt)$ where $V_o=-2\,W_o$ and $W=2(\pi)f$. This provision will furnish alternating electric fields at locations in the region between the electrodes that can be derived from the potential $$i\,V=[A\,x^2+B\,y^2+C\,z^2-W_0]\cos(\omega) \qquad (3)$$

In the presence of these alternating fields charged particles of either sign of charge will execute oscillations about a quasi-equilibrium position and if the frequency and intensity of the alternating fields, determined by the value of $V_o$ and $\omega$, are suitable, the oscillations will be of small displacement. It is well known to those practiced in the art that where there is a gradient of the intensity of the alternating electric fields, the motion of charged particles of either sign of charge takes place with a phase that relates to the field in such a way that as they oscillate, they experience an effective average force in a direction opposite to the gradient direction. In the region described above, the gradient of the intensity of the alternating fields in all three directions is directed away from the center, $x=y=z=0$; therefore there are average forces in all three directions that are directed toward that center for charged particles of either sign. Thus, with the appropriate values of frequency and intensity of electrical excitation of the belt shaped electrode, complete trapping can be achieved.

For a range of ion masses, an even more complex electrical furnishing may be imposed on the electrodes that can still maintain trapping conditions. This excitation, shown schematically in FIG. 1, provides a purely alternating potential $V_o\cos(\omega t)$ from generator 24 superposed on a direct current potential U as from a battery 25. The frequencies of motion of ions in the resulting fields in the trap, with the inclusion of the potential U, are altered in relation to the value of U, but the harmonic character of the motion remains and resonances of the ion motion can still be narrow.

The motion of trapped ions then comprises a superposition of the small oscillations that take place about quasi-stationary positions and slower motions that alter those quasi-stationary positions. In the trapping structure described, the latter motions in the directions of the three geometrical axes x,y, and z are characterized, in general, by three separate and distinct frequencies. Since the forces derived from the small oscillations are proportional to the displacement along each of the axes, the frequencies of the motion of the quasi-stationary positions are discrete and independent of the amplitude of the motion.

For ions having the same charge but different masses, the frequencies will be dependent on the mass, thereby giving a means to distinguish their masses.

A single ion oscillating in the trap described above will induce motion of electrical charge in the surrounding electrodes, sometimes described as the image charge. The motion of the image charge reflects the motion of the ion moving in the trapping structure 17, 18, 19, and at the same time gives rise to electrical currents in the external circuits 36 and 37 attached to caps 17 and 18. Were they large enough, these currents could be detected as a signal representing the motion of the ion.

In a practical example, the motion of a single ion would induce currents so small that they could not be detected. However, the motion of a collection of ions may induce currents sufficiently large to be detected, provided that the motions of individual ions are constrained to be coherent. Unfortunately, the normally practiced methods of ionization do not provide for ions whose motion is coherent. One method to establish a coherent motion of the ions so that they will oscillate collectively and induce sufficiently large currents in the external circuits consists of a two-step process. In the first step ions are generated within the trap region along the symmetry plane of the trap structure shown in FIG. 1. The E-gun pulser 15 injects a short pulse of electrons into the trap, passing through hole 22 in the electrode structure 19, ionizing molecules along the symmetry plane of the trapping structure consisting of electrodes 17, 18 and 19. These ions will then remain at the bottom of the potential well generated by the rf field applied by generator 24 to the trapping structure electrodes. Any ions that are displaced from the symmetry plane will oscillate about the symmetry plane with a frequency that is a function of the charge-to-mass ratio of that ion. The collection of ions within the trap can be induced to have a coherent collective motion by applying a suitable electric field pulse within the trap region via pulse generator 31. The time duration of this electric field pulse can take several forms as indicated in FIGS. *2b*, *2c* and *2d*. The time of this excitation pulse is indicated in FIG. *2a* as occurring after the termination of the ionization pulse of the electrons. The pulse shape indicated by FIG. *2b* is a short duration single high voltage excitation pulse that has an amplitude and duration sufficiently rapid to give the ions an impulse and thereby disturb their equilibrium position in the central plane of a trap, but weak enough so that few, if any, of the ions are actually lost by colliding with the trap in cap 17 or 18 and thereby being neutralized. At the end of this excitation pulse, the ions will continue to oscillate, each with its own characteristic frequency about the central plane of the trap as indicated in FIG. *2a*. The coherent oscillation induces a voltage which is applied across the input of amplifier 41 and later converted by the ADC 45 to a digital bit pattern retained by memory 47. The frequencies of the individual ions can then be extracted by activating Fourier analyzer 51 and displaying the amplitude vs. frequency data on display and storage device 55. At the end of the free oscillation a sweep-out pulse can be applied as indicated in FIG. *2a* to sweep out any ions remaining in the trap.

In some cases it may be desirable to excite only a few species of the ions within the trap. For example, if one wanted to analyze the abundance of only one specific ion, one can selectively excite it by applying an excitation field which could consist of a sinusoidal waveform, that is, one that is pulsed on during the time T2 illustrated in FIG. *2a*. The amplitude and duration of this pulsed excitation must be selected so that it is sufficient to excite the desired ion species out of the central plane, but not so large that it causes these ions to collide with the end caps and thereby be neutralized. If it is desired to excite several species, a waveform of FIG. *2c* may be used where the sine wave is actually swept over the desired frequency components. Alternatively, a wave shape can be judiciously chosen so that its Fourier transform contains only the frequencies of the ions that are to be detected. Such a wave shape is is illustrated schematically in FIG. *2d*.

Instead of electron ionization as described above, one could effectively use optical radiation to provide the ionization. Here the E-gun pulser 15 is replaced by a laser which can be pulsed to emit a photon beam that is closely confined to the central plane of the trap region. Controller 52 can cause it to be pulsed in a way similar to the way the E-gun was pulled, thereby replacing the ionization pulse of electrons illustrated in FIG. *2a* by similar ionization pulse by optical photons. The remainder of the procedure containing the excitation pulse, the free oscillation and detection remains as described above.

In the description above the ions were generated in a small region confined to the central plane of the ion trap. One may also use a somewhat broader electron or optical pulse and generate ions throughout the trap region so that the ion motions will occupy all allowable positions within the trap, resulting in a lack of coherence and resulting in no detectable signal being induced in the surrounding electrodes. In this case the ions have a wide distribution of phases and amplitudes as they oscillate in the trap.

In order to obtain a large induced signal into the external circuit it is necessary to provide for some phase coherence of the oscillating ions. One method to induce coherence is to remove a selected group of the ions from the population. In this method the maximum coherence may be achieved when the selected ions contain about one-half the total initial ion population. They can be removed by an excitation that causes the selected ions to strike the boundaries of the trap and thereby to be neutralized. This is, in fact, a method that may be termed excitation by subtraction, and can be used to excite a residual coherence in a population of oscillating ions in which all phases and amplitudes of motion were initially equally favored.

One method for bringing about this desired coherence, in the case for motion in the z direction, and for detecting and using the result can be described by further reference to FIG. 1. In this case, the cap-shaped electrodes 17, 18 are nominally connected to zero potential, or ground, at 26. A suitable combination of DC voltages U and AC voltages V are applied to the belt-shaped electrode 19. Assuming that the trap is charged with a number of ions whose initial state is made up of incoherent motions at a point in time, an additional potential is impressed on the trap via the cap shaped electrodes 17 and 18 from pulse generator 31. The pulse generator is normally isolated from the circuit by diodes 34, 35.

It is desireable that the pulse be applied for a time interval that is short compared with the slower motions followed by the ions as described above. The effect of this pulse is to displace the ions from their initial states in both position and momentum. If the pulse is sufficiently intense, a fraction of the ions will be displaced or accelerated sufficiently to be lost from the population in the trap by collisions with the walls, while those remaining will exhibit a residual coherence that will induce motions of image charges in the external circuit elements connected to the cap-shaped electrodes 17 and 18.

Another method of generating phase coherent ions can be related to the way the ions are produced; i.e., it is possible to ionize the molecules so that the ions that are produced have phase coherence at the conclusion of the ionization process. With reference to FIG. 1 this ionization process can be obtained by placing the electron gun 14 above or below the plane of electrical symmetry produced by electrodes 17, 18 and 19. By placing the hole 22 and the electron gun 14 away from the symmetry plane $z=0$, one can generate coherent ion oscillations by pulsing the gun to produce a high current electron beam for a time short compared to an oscillation period of the ions. One could also establish this ionization process in a system where hole 22 and electron gun 14 produce an electron beam in the $z=0$ plane which is equidistant from the two electrodes 17 and 18. In this case pulse generator 31 is used to apply a small potential difference between electrodes 17 and 18 during the time the electron beam is on. The application of this potential shifts the equilibrium position of ions away from the center plane. In this case the electron beam may be left on during many oscillation periods of the ions. When a sufficient number of ions have been generated, the electron beam is switched off. The pulse generator 31 is then turned off in a time period that is short compared to an ion oscillation period. The ions are then left to oscillate coherently about the new equilibrium position at $z=0$.

Electromagnetic radiation offers another way to ionize the molecules so that the ions that are produced have phase coherence at the conclusion of the ionization process. With reference to FIG. 1, the laser 60 may be pulsed to produce a short burst of optical radiation 62 that enters the vacuum enclosure through a suitable window 63. The radiation then enters the vacuum enclosure and passes through a small hole in electrode 19 so that it enters the region enclosed by electrodes 17, 18 and 19. The path of the optical radiation can be chosen to be parallel to the plane $z=0$ displaced from it so that lines generated by the optical radiation will not be in their equilibrium position. By making the optical pulse short compared to the slower motions of the ions, a non-equilibrium position of the resulting ions will be obtained. These ions will then generate a coherent ion oscillation that induces charges upon electrodes 17 and 18 that oscillate in synchronism with the oscillations of ions, thereby permitting their detection and identification by their characteristic frequencies. The laser power supply 64 receives its synchronizing starting pulse from controller 52 coupled to it through switch 66.

After the establishment of an initial coherence, the ions will slowly lose their coherence by any collisions with the residual neutral gas, and other factors. THe initial coherent motions of the ions induce image charges on the electrode structure and establishes a signal voltage at the terminals 36 and 37 of the resistors 27 and 28. This voltage is transferred to the input of amplifier 41 whose output is conveyed to the analog-to-digital converter 45 for conversion to a digital form and storage in a suitable digital memory 47 for later processing. The analog to digital converter is cyclic, operating under the command of the clock source 48. The same clock command advances the address counter 49 so that the array of values stored are the sequential digitized replicas of the progressing values of the amplified voltage at the output of amplifier 41. The information stored therefore represents the time domain oscillations of the ions present.

Figure 4A:
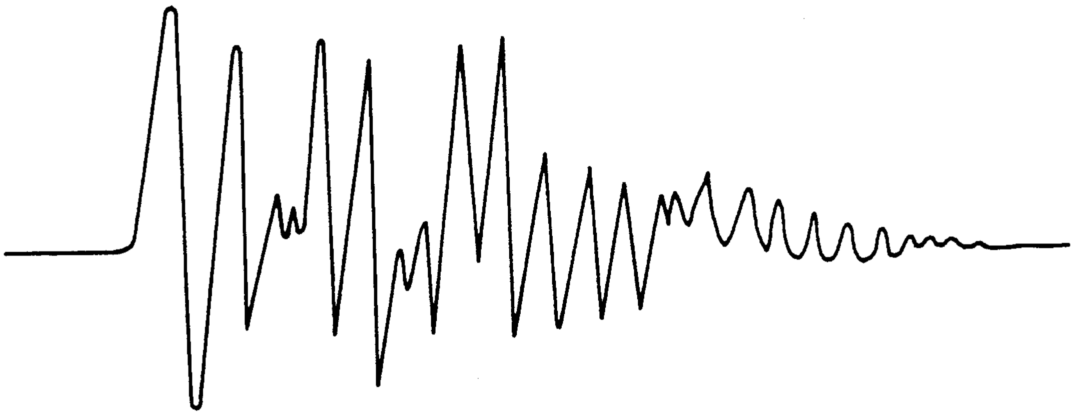
Figure 4B:
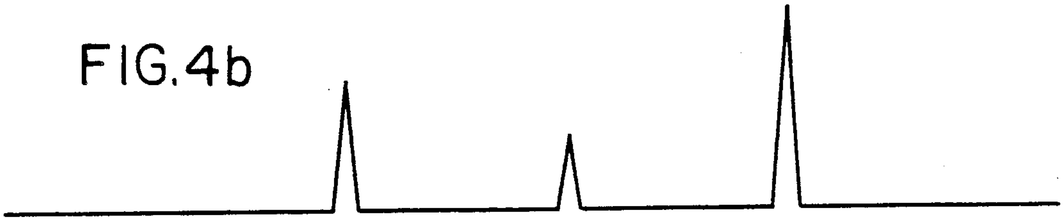

It is desireable to reformulate the information, implicit in the time domain signal stored, into the frequency domain wherein the ion masses can be directly inferred. The relationship between the two representations is the Fourier transformation. The time domain and frequency domain representations of the signal comprise a Fourier transform pair as exemplified in FIG. 4*a* and 4*b*. Modern digital computers can carry out Fourier transformation with considerable facility; it is thus relatively simple to extract the desired spectral domain information from the data set stored, using the Fourier analyzer 51 to present the results in the display and storage device 55.

The amplitude of signals detected from a given species of ion is proportional to the number of ions present and depends in a complicated way on the excitation pulse applied. In principle, if the ion motions are initially distributed over all the possible phases and amplitudes, there can be a pulse of suitable shape, or a sequence of pulses, that will excite each species of ion present to a desired predictable degree to coherence up to the maximum coherence possible. This can be shown on theoretical grounds for the case where sufficient time is allowed for an excitation sequence that is made up of a superposition of narrow band, alternating signals at a modest amplitude and centered on the frequencies at which the individual ion species respond. If the spectral density of the excitation for one ion species does not have appreciable value at the frequency at which another ion responds, then, by proper adjustment of the time and intensity of the narrow band alternating signals, the maximum possible signal intensity from every species of ion can be realized.

The sequence of operation of the system can be understood with reference to FIG. 2. One possible sequence is illustrated in FIG. 2*a*. To begin, the trap region contains a number of sample molecules. At the beginning of an operation cycle, a fractional number of these molecules are ionized, and may be fragmented, by application of a pulse of electrons having sufficient energy to cause ionization, for an interval T1 of time, typically a few microseconds to a few milliseconds. These ions are formed with a wide range of energies and phases referring to their oscillation in the trap; i.e., they are incoherent. In a second interval T2, the excitation pulse is applied to bring about the coherence necessary for observation of the ion oscillations. Following the excitation pulse, the oscillations of ions of all species excited induce signals representing a superposition of the signals due to the motion of the individual ions with their individual amplitudes and frequencies. These signals are amplified, detected, converted to digital form and stored. Finally, the ions remaining in the trap are swept out by a sustained destabilizing pulse to prepare the apparatus for the next cyclic sequence.

The final reduction of the signals detected to a spectrum of ion peaks requires the application of a Fourier transform to the time domain data that have been acquired and digitally stored. Alternatively, prior to Fourier analysis, time domain data from a number of repeated sequences can be acquired and averaged with accumulation of the averaged values taking place in the data memory. The Fourier transformation of the averaged data will then show improved signal-to-noise in accordance with the square root of the number of sequences observed according to well known practice.

The key to realizing a Fourier transformed spectrum of mass peaks that are proportional in intensity to the number of ions initially present in the trap lies in the nature of the excitation pulse that is applied. As mentioned above, if several species of ion be trapped, a superposition of narrow band alternating signals at modest amplitudes and with frequencies centered on the frequencies at which the individual ion species respond, and lasting for a time sufficiently long to excite each species to maximum coherence will bring about the desired quality in the final spectrum. Alternatively, as mentioned, a single short pulse will excite some degree of coherence in each species of ion depending on the duration and intensity of the pulse.

Figure 2A:
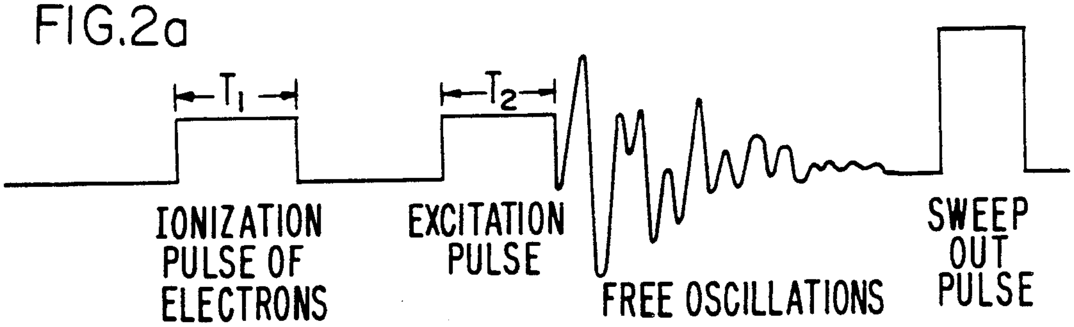
Figure 2B:
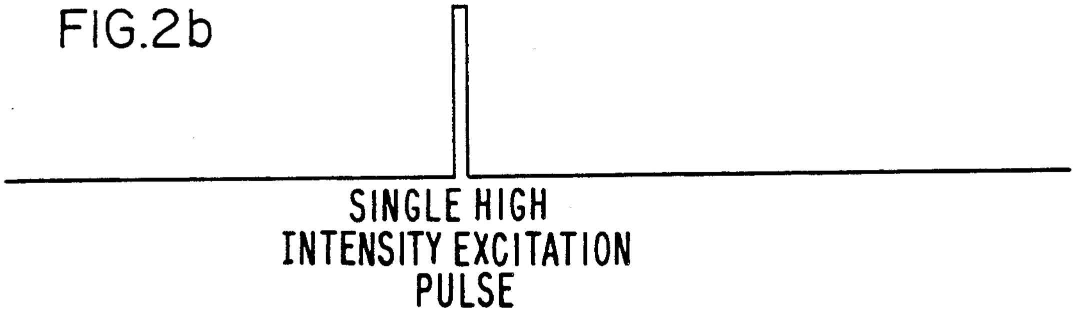
Figure 2C:
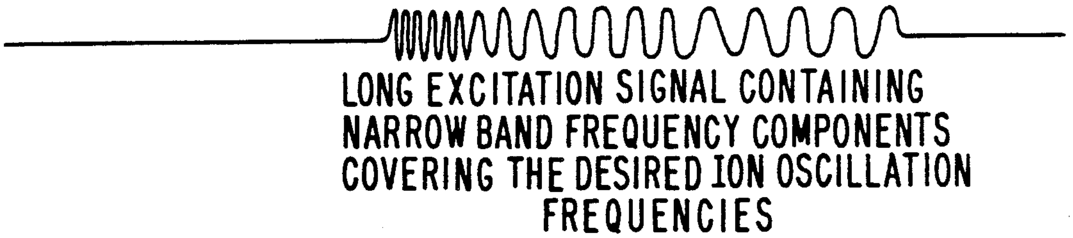
Figure 2D:
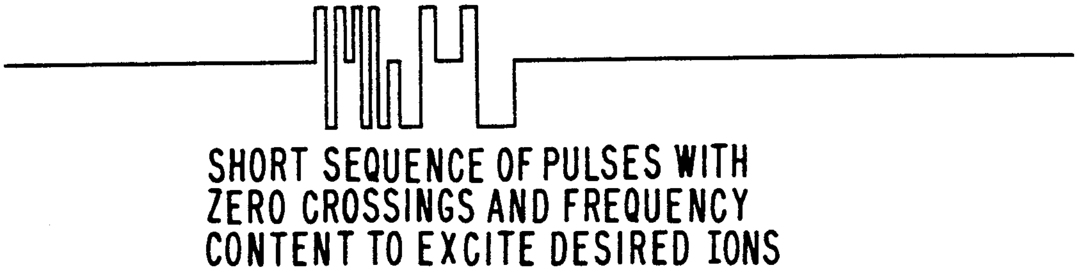

For some applications it is desired to control the degree of coherence excited either to produce a more uniform response of the various ion species, or to enhance the response of selected ion species. This desired result can be accomplished using an excitation pulse that is more complex than the single square pulse postulated above. Conceptually, a train of alternating signals at substantial amplitude and with rapidly varying frequency, covering the range of frequencies at which the desired ions individually oscillate would serve the requirement. Alternatively, a pulse sequence at greater amplitude with a few alternations of sign, but with suitable distribution of pulse widths would provide the required excitation. The excitation sequences described are shown in FIG. 2*b*, 2*c*, and 2*d*. The requirement of these excitation pulse sequences is that they provide a spectral component to excite coherence to the desired degree in each species of ion to be observed, while at the same time not accidentally destroying the population of another species of ion. With a low level of long lasting excitation at one or several frequencies, there is no danger of this accidental event. However, the shorter and more intense pulses must be carefully constructed to avoid the danger.

By the Fourier theorem, a short pulse contains energy over a range of frequencies that is broader as the pulse gets shorter. To cover the excitation requirements for a range of ion species, a sufficiently narrow pulse of high intensity has the frequency components to excite all of the ions present. However, with such a pulse, there is considerable energy at frequencies that are nonresonant with any ion species. It may be desirable, therefore, to construct a pulse of complex shape that contains more nearly the frequencies required, with less energy at frequencies not needed. In general, the reduction of unwanted frequencies can be reduced in proportion to the number of alternations in the excitation pulse, while the required distribution of spectral density is also governed by the width and amplitude of the alternating components of the pulse. FIG. 2*c* satisfies this description insofar as the number of alterations is large. In fact it represents a good approach to the excitation requirement. However, for a case involving a wide range of ion masses, to eliminate the danger of destruction of some ion populations, the total time of excitation may be longer than desired. To reduce this time, a composite of narrow pulses with a moderate number of alternations is shown in FIG. 2*d*. The alternations reduce the energy density at unwanted frequencies, while the narrow pulses provide coverage of a sufficient range of frequencies to excite coherence in the ions in question. The actual pulse shape used to satisfy a particular excitation need is susceptible to analysis.

A second method of establishing a trap region, using a similar geometry of electrodes to that mentioned above, but in this case immersed in a uniform constant magnetic field $H_o$ relies on the Penning effect. The simultaneous application of the homogeneous magnetic field and a static electric field of the proper symmetry will provide a trapping region for ions of one sign of electric charge. For positive ions, if the ring shaped electrode is held negative with respect to the cap shaped electrodes, trapping can occur with a magnet field disposed in either sense in a direction parallel to the axis z joining the end cap electrodes.

The simplest form of the Penning trap is realized when the electrodes that form the boundaries of the trap have circular symmetry about the axis z through the cap electrodes. In this case, a complete solution of the ion motion can be written in analytic form. A desireable feature of the Penning trap case lies in the fact that while the motions in the directions perpendicular to the z axis are trochoidal, and characterized by more than one frequency in a complicated way that depends on the value of both the magnetic and the electric fields, the motion in the z direction is a simple harmonic one with a single frequency that depends only on the value of the electric field components in the z direction. For this motion, the magnetic field serves only to provide the trapping forces in directions perpendicular to the z axis.

The electric field in the trap can be derived from a potential written following the form of equation 2 as follows:

$$T = -A(x^2+y^2-2z^2) - W_o \tag{4}$$

where $W_o$ is chosen so that the potential at the cap shaped electrodes is zero and the potential at the ring shaped electrode is at $-2W_o$. Under these circumstances, the force Fz in the z direction on an ion is proportional to the component of electric field in the electric z-direction and to the charge q of the ion. The electric field is the negative gradient of the potential; thus $$F_z = -q\ \text{gradient}_z\ T = 4Aqz = -\frac{2W_o}{z_o^2}\,qz \tag{5}$$

at all points in the trapping volume, where $\pm z_o$ are the apex positions of the cap shaped electrodes.

As a result of this force, the motion in the z direction for ions of mass m will be described by the differential equation $$m\frac{d^2z}{dt^2} = -2q\frac{2W_o}{z_o^2}z \quad (6)$$

or $$\frac{d^2z}{dt^2} + \frac{2qW_o}{mz_o^2}z = 0$$

This differential equation has solutions that are pure harmonic motion of the form $$z = a\cos\left(\left(\frac{q2W_o}{mz_o^2}\right)^{\frac{1}{2}}t + \phi\right) \quad (7)$$

where $a < z_o$ is the amplitude of the motion and $\phi$ is the phase.

Referring now to FIG. 3, electrons from the filament 84 are caused to flow for an initial period through aperture 81 into the interior of the trap defined by the boundary electrodes 77, 78 and 79. These electrons encounter molecules of the sample and bring about ionization by impact, creating ions and ionized fragments of the molecules, having characteristic mass. These ions are confined in directions x and y by the magnetic field $H_o$ in spite of the presence of electric fields that would otherwise persuade them to move toward the ring shaped electrode 79. The z component of the electric fields prevents the ions from reaching the end caps 77 and 78, and provides the harmonic restoring force in the z direction given in Eq. (5) above.

Unfortunately, the ions, being formed with every possible displacement from the plane z=0 and at random times, move incoherently so that a resulting signal which would appear at the input of amplifier 103 is so small as to be undetectable. The condition that is required to give a sensible signal is that an excitation pulse be applied to the ion population in such a way as to bring about a coherent motion. The excitation sequence is applied to electrode 77 from an exciter 97 via a programmed switch 98 (whose programming control is not shown). As was the case in the first example described above, the coherence may be brought about by subtraction.

All of the arguments made in that first example regarding excitation of ions in that trap apply in equal measure to excitation of coherence in the Penning trap of the second example, and will not be repeated.

In this second method, with an appropriate sequence of events as depicted in FIG. *2a*, with an appropriate excitation sequence following the cases shown in FIGS. *2b*, *2c*, and *2d*, time domain signals will appear at the input of amplifier 103 of FIG. 3. These signals can be treated in every way as they were in the first method described above, being conveyed to an analog to digital converter and a digital memory (not shown), and then being presented to a computer (not shown) to generate the Fourier transform of the time domain signals digitized and stored as before, which is a representation the desired mass spectrum of the ions. The time domain and frequency domain representations of the signal comprise a Fourier transform pair as exemplified in FIG. *4a* and *4b*. A single cycle of ionization, excitation, amplification of the time domain signals, digitization, storage, and Fourier transformation is sufficient, with the appropriate excitation, to render a complete mass spectrum over a range of masses as described for the first example. Alternatively, a number of sequences can be carried out, the digital data being averaged, as described before, prior to Fourier transformation, for the improvement of signal to noise.

This invention is not limited to the preferred embodiments and alternatives heretofore described, to which variations and improvements may be made including mechanically and electrically equivalent modifications, changes and adaptations to component parts, without departing from the scope of protection of the present patent and true spirit of the invention, the characteristics of which are summarized in the appended claims.

What is claimed is:

1. A method of analyzing a gas sample having plural species comprising the steps of:

decomposing molecules, molecular fragments and atoms of the sample into ions;

applying a trapping field to the ions so that the ions are confined in a fixed volume of space about an equilibrium plane;

disturbing the ions so that the ions have coherently oscillating components at right angles to the equilibrium plane at frequencies that are a function of the masses of the species of the ions and amplitudes that are a function of the numbers of ions of each species; and analyzing the frequencies and amplitudes of the oscillations after said step of disturbing is completed.

2. The method of claim 1 wherein said step of disturbing comprises applying an electric field having different amplitudes for differing frequency components to the ions in the equilibrium plane.

3. The method of claim 2 wherein the electric field has a sinusoidal wave-like time variation with sinusoidal cycles having differing periods and having differing amplitudes.

4. A method of analyzing a gas sample having plural species, the sample being in a vacuum including spaced electrodes, comprising the steps of:

decomposing molecules, molecular fragments and atoms of the sample into ions;

applying a trapping field to the ions;

disturbing the ions so that the ions form a coherent oscillation perpendicular to an equilibrium plane, the ions being disturbed by applying a sinusoidal wave-like voltage variation including sinusoidal cycles with differing periods having differing amplitudes as a function of the masses of differing species in the sample desired to be detected, the ions oscillating relative to the electrodes at frequencies that vary inversely with the square root of the mass of the ions to cause charges to be induced on the electrodes at the oscillating frequencies; and analyzing the frequencies of the charge oscillations induced by the ions on at least one of the electrodes after said step of disturbing is completed.

5. Apparatus for analyzing a gas sample in a vacuum comprising:

ionizing means for decomposing molecules, molecular fragments and atoms of the sample into ions;

trapping means for trapping the ions in a region about an equilibrium plane;

exciting means for applying an excitation field to the trapped ions to alter the position of species of interest in the sample so that different species of interest coherently oscillate perpendicular to the equilibrium plane at a frequency determined by the charge to mass ratio thereof; and response means responsive to the oscillating ions for deriving an electric response after said step of disturbing is completed.

6. The apparatus of claim 5 wherein said response means includes a means for deriving a response which is representative of the motion of the oscillating ions so that different species cause the electric response to be oscillations at different frequencies, the relative amplitudes of the different frequencies being proportional to the number of ions of the different species.

7. The apparatus of claim 5 including frequency analyzer means response to said response means, said frequency analyzer means including an X-Y display having frequency and amplitude axes.

8. Apparatus for analyzing a gas sample in a vacuum comprising:

ionizing means for decomposing molecules, molecular fragments and atoms of the sample into ions;

trapping means for trapping the ions in a region about an equilibrium plane;

exciting means for applying an excitation field to the trapped ions to alter the position of species of interest in the sample so that they are not uniformly distributed about the equilibrium plane and so that the species of interest coherently oscillate perpendicular to the equilibrium plane at a frequency which depends on the mass thereof; and response means responsive to the oscillating ions for deriving an electric response after said excitation field is terminated.

9. The apparatus of claim 8 wherein said trapping means includes means for supplying an electric field to the ions.

10. The apparatus of claim 8 wherein said trapping means includes means for applying a DC magnetic field to the ions.

11. The apparatus of claim 8 wherein said response means includes means responsive to the oscillating ions for deriving an electric response that is a representation of the motion of the oscillating ions.

12. The apparatus of claim 11 further including frequency analyzer means responsive to the representation.

13. The apparatus of claim 8 wherein said trapping means includes means for establishing an interior trapping volume and the means for ionizing includes means for supplying an electron beam to the interior trapping volume, and means for pulsing the electron beam into an on condition.

14. The apparatus of claim 13 wherein said trapping means includes means for supplying an electric field to the trapping volume.

15. The apparatus of claim 14 wherein said trapping means includes means for supplying an AC electric field to the trapping volume, the AC electric field bring such that the averagae position of electric lines of force thereof are in a plane that is coplanar with or parallel to a plane containing the electron beam in the interior trapping volume so the ions are respectively trapped in the plane containing the electron beam or a plane parallel to the electron beam.

16. The apparatus of claim 15 wherein said trapping means includes an electrode having a belt-like shape defined by an elliptical hyperboloid having intersecting major and minor axes of symmetry in a plane containing the electron beam in the interior trapping volume, the interior trapping volume being inside of the belt-like electrode, the electron beam source being outside of the belt-like electrode, the belt-like electrode having an entrance for admitting the electron beam to the inside of the belt-like electrode.

17. The apparatus of claim 16 wherein said trapping means includes a pair of inverted cap-like electrodes symmetrically spaced from each other and equidistant from the plane containing the major and minor axes and being defined by an elliptical hyperboloid having an axis of symmetry at right angles to the plane containing the major and minor axes and intersecting the intersection of the major and minor axes.

18. The apparatus of claim 17 wherein said trapping means includes means for applying an AC voltage to the belt-like electrode relative to a reference potential applied to both of the cap-like electrodes.

19. The apparatus of claim 17 wherein said trapping means includes means for applying a DC voltage to the belt-like electrode relative to a reference potential applied to both of the cap-like electrodes.

20. The apparatus of claim 17 wherein said exciting means includes means for applying an electric field between the cap-like electrodes and the belt-like electrode.

21. The apparatus of claim 17 wherein the oscillating ions induce charges on the cap-like electrodes, and the electric response deriving means includes an input terminal on at least one of the cap-like electrodes on which is derived an electric signal having frequency components that are related to the motion or the ions.

22. The apparatus of claim 21 wherein said trapping means includes means for applying a DC magnetic field to the ions.

23. The apparatus of claim 13 wherein said trapping means includes means for applying a DC magnetic field to the ionized atoms such that lines of flux of the magnetic field extend in the same direction as the electron beam in the interior trapping space.

24. The apparatus of claim 23 wherein said trapping means further includes electrode means positioned, arranged and biased so that the electrode means produces an electric field that interacts with the magnetic field to trap the ions in a plane in the trapping volume perpendicular to the electron beam path in the trapping volume.

25. The apparatus of claim 24 wherein said exciting means includes means for applying an electric field between the cap-like and belt-like electrodes.

26. The apparatus of claims 5 or 8 wherein the ionizing means includes means for irradiating the gas sample with electromagnetic radiation.

27. The apparatus of claims 5 or 8 wherein said response means comprises:

detector means for detecting an analog time domain signal from said coherently oscillating ions;

digitizer means for converting said analog time domain signal into a digital signal; and, Fourier transform means for deriving a frequency domain signal from said digitized time domain signal.

28. Apparatus for analyzing a gas sample in a vacuum comprising:

means for applying an ion trapping field within an interior space comprising first, second and third electrodes having a common longitudinal axis about which all of the electrodes are symmetrically located, said first electrode being between said second and said third electrodes, said first electrode having a belt-like shape defined by an elliptical hyperboloid having intersecting major and minor axes of symmetry in a plane and at right angles to the longitudinal axis, said second and third electrodes being defined by a pair of inverted cap-like electrodes symmetrically spaced from each other and equidistant from the plane containing the major and minor axes and being defined by an elliptical hyperboloid having an axis of symmetry at right angles to the plane containing the major and minor axes and intersecting the intersection of the major and minor axes, the space between said first, second and third electrodes defining said interior volume;

means for introducing a charged particle beam into the interior volume for decomposing molecules, molecular fragments and atoms of the sample into ions in the interior space;

means for applying an excitation voltage to at least one of said electrodes to cause the ions to oscillate at characteristic frequencies perpendicular to an equilibrium plane; and, means responsive to a charge induced on at least one of the electrodes in response to the oscillating ions after said excitation voltage is terminated.

29. The apparatus of claim 28 including frequency analyzer means responsive to a signal derived in response to the induced charge.

30. The apparatus of claim 28 wherein the charged particle beam is an electron beam.

31. The apparatus of claim 28 wherein the trapping field applying means includes means for applying an electric field and a DC magnetic field to the trap region.

* * * * *